US012807833B2

(12) United States Patent
Larimer et al.

(10) Patent No.: US 12,807,833 B2
(45) Date of Patent: Nov. 24, 2026

(54) FILIFORM CORROSION RESISTANT COATING COMPOSITIONS

(71) Applicant: PPG Industries Ohio, Inc., Cleveland, OH (US)

(72) Inventors: Troy James Larimer, North Huntingdon, PA (US); Susan Fundy Donaldson, Allison Park, PA (US); Pawel Maciej Krys, Allison Park, PA (US); Alicia Marie Phelps, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 405 days.

(21) Appl. No.: 18/564,816

(22) PCT Filed: May 27, 2022

(86) PCT No.: PCT/US2022/072607

§ 371 (c)(1),
(2) Date: Nov. 28, 2023

(87) PCT Pub. No.: WO2022/256783

PCT Pub. Date: Dec. 8, 2022

(65) Prior Publication Data

US 2024/0279503 A1 Aug. 22, 2024

Related U.S. Application Data

(60) Provisional application No. 63/195,739, filed on Jun. 2, 2021.

(51) Int. Cl.

| | |
|---|---|
| ***C09D 133/06*** | (2006.01) |
| ***C08F 220/14*** | (2006.01) |
| ***C08G 59/32*** | (2006.01) |
| ***C08G 59/40*** | (2006.01) |
| ***C08G 59/42*** | (2006.01) |
| ***C09D 5/03*** | (2006.01) |
| ***C09D 163/00*** | (2006.01) |

(52) U.S. Cl.

CPC ........ *C09D 133/068* (2013.01); *C08F 220/14* (2013.01); *C08G 59/3209* (2013.01); *C08G 59/4028* (2013.01); *C08G 59/42* (2013.01); *C09D 5/03* (2013.01); *C09D 163/00* (2013.01); *C08F 2800/20* (2013.01); *C08F 2810/20* (2013.01); *C08F 2810/50* (2013.01)

(58) Field of Classification Search

CPC .... C09D 133/068; C09D 5/03; C09D 163/00; C08F 220/14; C08F 2800/20; C08F 2810/20; C08F 2810/50; C08G 59/3209; C08G 59/4028; C08G 59/42

See application file for complete search history.

(56) References Cited

U.S. PATENT DOCUMENTS

| | | | | |
|---|---|---|---|---|
| 3,989,767 | A | 11/1976 | Homma et al. | |
| 5,407,747 | A | 4/1995 | Sammel et al. | |
| 5,710,214 | A | 1/1998 | Chou | |
| 7,723,410 | B2 | 5/2010 | Daly et al. | |
| 10,626,277 | B2 | 4/2020 | Iacob et al. | |
| 2003/0077469 | A1 | 4/2003 | Schneider | |
| 2005/0090627 | A1 | 4/2005 | Wenning et al. | |
| 2005/0197460 | A1 | 9/2005 | Patel et al. | |
| 2006/0188655 | A1 | 8/2006 | Reising et al. | |
| 2007/0078235 | A1 | 4/2007 | Lu et al. | |
| 2009/0227708 | A1 | 9/2009 | Daly et al. | |
| 2010/0311896 | A1 | 12/2010 | Cavalieri et al. | |
| 2014/0357766 | A1 | 12/2014 | December et al. | |
| 2016/0355626 | A1 | 12/2016 | Larson et al. | |
| 2017/0158869 | A1 | 6/2017 | Martinoni et al. | |
| 2018/0319995 | A1 | 11/2018 | Schlager et al. | |
| 2024/0270978 | A1* | 8/2024 | Larimer | C09D 5/033 |

FOREIGN PATENT DOCUMENTS

| | | | |
|---|---|---|---|
| CN | 101932664 | A | 12/2010 |
| CN | 109135495 | A | 1/2019 |
| JP | H0198672 | A | 4/1989 |
| JP | H06506154 | A | 7/1994 |
| JP | 2002-069368 | A | 3/2002 |
| JP | 2002212499 | A | 7/2002 |
| KR | 20120108194 | A | 10/2012 |
| WO | 1993013875 | A1 | 7/1993 |
| WO | 2019/124051 | A1 | 6/2019 |
| WO | 2021/030664 | A1 | 2/2021 |

OTHER PUBLICATIONS

JP2002212499 machine translation (2002).*
International Search Report and Written Opinion received for PCT Application Serial No. PCT/US2022/072607 dated Oct. 10, 2022, 10 pages.

* cited by examiner

*Primary Examiner* — Blaine Copenheaver

(57) ABSTRACT

The present invention relates to a powder coating composition including: an addition polymer including epoxy functional groups: a carboxylic acid functional crosslinker: and a blocked isocyanate functional crosslinker. The addition polymer is obtained from components including at least one epoxy functional ethylenically unsaturated monomer. The components include an amount of the at least one epoxy functional ethylenically unsaturated monomer within a range of greater than 10 weight % and less than 22 weight %. based on the components that form the addition polymer.

20 Claims, No Drawings

FILIFORM CORROSION RESISTANT COATING COMPOSITIONS

FIELD OF THE INVENTION

The present invention relates to powder coating compositions.

BACKGROUND OF THE INVENTION

Substrates, such as metal substrates including those used in vehicles, are often provided with coatings to provide corrosion resistance. For example, substrates have been coated with a corrosion-resistant coating to provide corrosion resistant properties. Coatings with corrosion resistant properties may be applied over said substrates to protect the substrates from corrosion over time.

SUMMARY OF THE INVENTION

The present invention is directed to a powder coating composition, including: (a) an addition polymer including epoxy functional groups, where the addition polymer is obtained from components including: (i) at least one epoxy functional ethylenically unsaturated monomer, where the components include an amount of (i) the at least one epoxy functional ethylenically unsaturated monomer within a range of greater than 10 weight % and less than 22 weight %, based on the components that form the addition polymer; (b) a carboxylic acid functional crosslinker; and (c) a blocked isocyanate functional crosslinker.

DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and the plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" crosslinker, "an" addition polymer, and the like refer to one or more of any of these items. Also, as used herein, the term "polymer" is meant to refer to prepolymers, oligomers, and both homopolymers and copolymers. The term "resin" is used interchangeably with "polymer".

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

The present invention is directed to a powder coating composition, comprising: (a) an addition polymer comprising epoxy functional groups, wherein the addition polymer is obtained from components comprising: (i) at least one epoxy functional ethylenically unsaturated monomer, wherein the components comprise an amount of (i) the at least one epoxy functional ethylenically unsaturated monomer within a range of greater than 10 weight % and less than 22 weight %, based on the components that form the addition polymer; (b) a carboxylic acid functional crosslinker; and (c) a blocked isocyanate functional crosslinker.

The powder coating composition comprises an addition polymer, and the addition polymer may be formed from the linking of monomers without the co-generation of other by-products. The components used to form the addition polymer may be solid at ambient temperature (20° C.-25° C.). The addition polymer of the powder coating composition may be derived from ethylenically unsaturated monomers (e.g., by emulsion polymerization). As used herein, "ethylenically unsaturated" refers to a group having at least one carbon-carbon double bond. Non-limiting examples of ethylenically unsaturated groups include, but are not limited to, (meth)acrylate groups, (meth)acrylamide groups, vinyl groups, or combinations thereof. As used herein, the term "(meth)acrylate" refers to both methacrylate and acrylate. Also, "(meth)acrylamide" and like terms refer to both acrylamide and methacrylamide.

The addition polymer is obtained from components comprising at least one epoxy functional ethylenically unsaturated monomer. The addition polymer may be obtained from additional components such as an additional ethylenically unsaturated monomer. The additional ethylenically unsaturated monomer may be different from the epoxy functional ethylenically unsaturated monomer.

Non-limiting examples of the epoxy functional ethylenically unsaturated monomer may include glycidyl methacrylate, glycidyl acrylate, 3,4-epoxy-1-butene, (R)-(+)-1,2-epoxy-9-decene. For example, one non-limiting epoxy functional ethylenically unsaturated monomer may include the Epoxy Embedding Medium kit commercially available from SigmaAldrich (St. Louis, MO). The epoxy functional (meth)acrylate monomer may include a mono-epoxy functional (meth)acrylate monomer.

The components used to form the addition polymer comprise the epoxy functional ethylenically unsaturated monomer in an amount of greater than 10 weight % and less than 22 weight %, based on the components that form the addition polymer. The components used to form the addition polymer may comprise the epoxy functional ethylenically unsaturated monomer in an amount of from 15 weight % to 20 weight %, based on the components that form the addition polymer.

The epoxy functional ethylenically unsaturated monomer may include at least 1, or at least 2, or at least 3 epoxy functional groups in the epoxy functional ethylenically unsaturated monomer. The epoxy functional ethylenically unsaturated monomer may comprise exactly 1 epoxy functional group, such that the epoxy functional ethylenically unsaturated monomer is a mono-epoxy functional ethylenically unsaturated monomer. The epoxy functional ethylenically unsaturated monomer may include from 1 to 3 epoxy functional groups in the epoxy functional ethylenically unsaturated monomer.

The addition polymer may comprise at least 1, at least 2, or at least 3 epoxy functional groups per repeat unit of the addition polymer. The addition polymer may comprise exactly 1 epoxy functional group per repeat unit of the addition polymer. The addition polymer may comprise from 1 to 3 epoxy functional groups per repeat unit of the addition polymer.

The additional ethylenically unsaturated monomers may comprise mono-ethylenically unsaturated monomers, multi-ethylenically unsaturated monomers, or combinations thereof. A mono-ethylenically unsaturated monomer refers to a monomer that comprises only one ethylenically unsaturated group, and a multi-ethylenically unsaturated monomer refers to a monomer that comprises two or more ethylenically unsaturated groups.

Non-limiting examples of ethylenically unsaturated monomers different from the epoxy functional ethylenically unsaturated monomers include, but are not limited to, alkyl esters of (meth)acrylic acid, hydroxyalkyl esters of (meth) acrylic acid, acid group containing ethylenically unsaturated monomers, vinyl aromatic monomers, (meth)acrylamide monomers, and combinations thereof.

Non-limiting examples of alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, and combinations thereof. Other non-limiting examples include di(meth)acrylate alkyl diesters formed from the condensation of two equivalents of (meth)acrylic acid such as, for example, ethylene glycol di(meth)acrylate. Di(meth)acrylate alkyl diesters formed from $C_2$-$C_{24}$ diols such as butane diol and hexane diol may also be used.

Non-limiting examples of hydroxyalkyl esters of (meth) acrylic acid include hydroxymethyl (meth)acrylate, hydroxyethyl (meth)acrylate, hydroxypropyl (meth)acrylate, hydroxybutyl (meth)acrylate, and combinations thereof.

Non-limiting examples of acid group containing ethylenically unsaturated monomers include (meth)acrylic acid, itaconic acid, maleic acid, fumaric acid, crotonic acid, aspartic acid, malic acid, mercaptosuccinic acid, and combinations thereof.

Non-limiting examples of vinyl aromatic monomers include styrene, 2,4-dimethylstyrene, ethylstyrene, isopropylstyrene, butylstyrene, vinyl naphthalene, vinyl toluene, divinyl aromatic monomers, such as divinyl benzene, and combinations thereof.

Non-limiting examples of (meth)acrylamide monomers include acrylamide, methacrylamide, N,N-dimethylacrylamide, di-(meth)acrylamide functional monomers such as N,N'-methylenebisacrylamide, and combinations thereof.

The additional ethylenically unsaturated monomers may comprise a functional ethylenically unsaturated monomer different from the epoxy functional ethylenically unsaturated monomer. As used herein, the term "functional ethylenically unsaturated monomer" refers to an ethylenically unsaturated monomer that comprises a group, in addition to the ethylenically unsaturated carbon-carbon double bond, that is reactive with the functionality of another component of the coating composition. The functional ethylenically unsaturated monomer may have at least one of a variety of reactive functional groups including, but not limited to, amine groups, hydroxyl groups, thiol groups, carbamate groups, amide groups, urea groups, carboxyl groups, aldehyde groups, ester groups, ether groups, carbonyl groups, and combinations thereof. Non-limiting examples of functional ethylenically unsaturated monomers include esters of acrylic or methacrylic acid, and hydroxyl functional monomers such as hydroxyethyl methacrylate. In one non-limiting example, a functional ethylenically unsaturated monomer may include an additional group that is reactive with the functionality of another component of the coating composition, but that is not reactive with the epoxy functionality of the at least one epoxy functional ethylenically unsaturated monomer used to obtain the addition polymer.

The additional ethylenically unsaturated monomer may comprise a non-functional ethylenically unsaturated monomer. As used herein, the term "non-functional ethylenically unsaturated monomer" refers to an ethylenically unsaturated monomer that does not comprise a group, in addition to the ethylenically unsaturated carbon-carbon double bond, that is reactive with the functionality of another component of the coating composition. The non-functional ethylenically unsaturated monomer may comprise an aliphatic non-functional ethylenically unsaturated monomer and/or an aromatic non-functional ethylenically unsaturated monomer. Non-limiting examples of non-functional ethylenically unsaturated monomers include styrene, methyl methacrylate, and n-butyl methacrylate.

The additional ethylenically unsaturated monomer may comprise at least one, at least two, at least three, at least four, or more different ethylenically unsaturated monomers. The additional ethylenically unsaturated monomer or monomers may comprise only functional ethylenically unsaturated monomers, or only non-functional ethylenically unsaturated monomers, or a combination of both functional and non-functional ethylenically unsaturated monomers. The additional ethylenically unsaturated monomer may include a plurality of different non-functional ethylenically unsaturated monomers. The non-functional ethylenically unsaturated monomers may comprise an aliphatic non-functional ethylenically unsaturated monomer and an aromatic non-functional ethylenically unsaturated monomer.

The components used to form the addition polymer may comprise the additional ethylenically unsaturated monomer in an amount of at least 50 weight %, or at least 55 weight %, or at least 60 weight %, or at least 65 weight %, based on the components that form the addition polymer. The components used to form the addition polymer may comprise the additional ethylenically unsaturated monomer in an amount up to 85 weight %, or up to 80 weight %, or up to 75 weight %, or up to 70 weight %, based on the components that form the addition polymer. The components used to form the addition polymer may comprise the additional ethylenically unsaturated monomer in a range of from 50 weight % to 85 weight %, such as from 55 weight % to 80 weight %, or from 60 weight % to 75 weight %, or from 65 weight % to 70 weight %, based on the components that form the addition polymer.

In one non-limiting embodiment, the components used to form the addition polymer may comprise the epoxy functional ethylenically unsaturated monomer in a range of from 10 weight % to 22 weight % based on the components that form the addition polymer, the additional ethylenically unsaturated monomer in an amount in the range of from 50 weight % to 85 weight % based on the components that form the addition polymer, with the remainder of the weight balance of the components used to form the addition polymer being additional materials and additives.

The addition polymer may have a number average molecular weight of at least 1,000 g/mol or at least 2,000 g/mol. The addition polymer may have a number average molecular weight of up to 8,000 g/mol or up to 5,000 g/mol. The addition polymer may have a number average molecular weight in the range of from 1,000 g/mol to 8,000 g/mol, such as from 2,000 g/mol to 5,000 g/mol.

The addition polymer may have a weight average molecular weight of at least 2,000 g/mol, or at least 4,000 g/mol, or at least 5,000 g/mol. The addition polymer may have a weight average molecular weight of up to 20,000 g/mol, or up to 16,000 g/mol, or up to 15,000 g/mol, or up to 12,000 g/mol. The addition polymer may have a weight average molecular weight in the range of from 2,000 g/mol to 20,000 g/mol, such as from 4,000 g/mol to 20,000 g/mol, such as from 5,000 g/mol to 20,000 g/mol, such as from 2,000 g/mol to 16,000 g/mol, such as from 5,000 g/mol to 15,000 g/mol, such as from 4,000 g/mol to 12,000 g/mol. For example, the addition polymer may have a weight average molecular weight in the range of from 7,000 g/mol to 8,000 g/mol.

Molecular weight (both number and weight average), as used herein, is determined by gel permeation chromatography using a polystyrene standard according to ASTM D6579-11 (performed using a Waters 2695 separation module with a Waters 2414 differential refractometer (RI detector); tetrahydrofuran (THF) was used as the eluent at a flow rate of 1 ml/min, and two PLgel Mixed-C (300×7.5 mm) columns were used for separation at the room temperature; weight and number average molecular weight of polymeric samples can be measured by gel permeation chromatography relative to linear polystyrene standards of 800 to 900,000 Da).

The addition polymer may have a Tg of at least 25° C., or at least 30° C., or at least 40° C., or at least 50° C. The addition polymer may have a Tg of up to 175° C., or up to 150° C., or up to 100° C., or up to 90° C., or up to 80° C., or up to 70° C. The addition polymer may have a Tg in the range of from 25° C. to 175° C., or in the range of from 25° C. to 150° C., or in the range of from 25° C. to 100° C., or in the range of from 25° C. to 90° C., or in the range of from 30° C. to 90° C., or in the range of from 40° C. to 90° C., or in the range of from 40° C. to 80° C., or in the range of from 50° C. to 80° C., or in the range of from 50° C. to 70° C. As used herein, the term "Tg" refers to glass transition temperature measured by differential scanning calorimetry according to ASTM D3418-12, unless otherwise indicated.

The addition polymer may comprise a thermoset polymer. As such herein, a "thermoset" polymer refers to a resin that sets irreversibly upon curing or crosslinking, wherein the polymer chains of the polymeric components are joined together by covalent bonds. Once cured or crosslinked, a thermoset polymer will not melt upon the application of heat and is insoluble in solvents. Further, as used herein, a "thermoplastic" polymer refers to a polymer that includes polymeric components that are not joined by covalent bonds and, thereby, can undergo liquid flow upon heating and are soluble in solvents.

The powder coating composition may include the addition polymer in an amount of at least 50 weight %, or at least 60 weight %, or at least 70 weight %, or at least 80 weight %, or at least 85 weight %, based on the total solids weight of the powder coating composition. The powder coating composition may include the addition polymer in an amount of up to 96 weight % or up to 95 weight %, or up to 94 weight %, or up to 90 weight %, based on the total solids weight of the powder coating composition. The powder coating composition may include the addition polymer in an amount in the range of from 50 weight % to 96 weight %, or in the range of from 60 weight % to 96 weight %, or in the range of from 70 weight % to 96 weight %, or in the range of from 70 weight % to 94 weight %, or in the range of from 80 weight % to 96 weight, or in the range of from 80 weight % to 95 weight %, or in the range of from 80 weight % to 90 weight %, or in the range of from 85 weight % to 96 weight %, or in the range of from 85 weight % to 95 weight %, or in the range of from 85 weight % to 90 weight %, based on the total solids weight of the powder coating composition.

The powder coating composition includes a carboxylic acid functional crosslinker. As used herein, a "crosslinker" refers to a chemical species comprising two or more functional groups that are reactive with other functional groups and which is capable of linking two or more monomers or polymer molecules through covalent bonds. The carboxylic acid functional crosslinker may be reactive with epoxide groups, such as the epoxide groups of the addition polymer. The carboxylic acid functional crosslinker may be solid at ambient temperature (20° C.-25° C.).

The carboxylic acid functional crosslinker may include various types of polyacids. As used herein, a "polyacid" refers to a compound that comprises at least two carboxylic acid functional groups. The carboxylic acid functional crosslinker may comprise a $C_3$-$C_{30}$ alkyl, alkenyl, or alkynyl compound with two or more carboxylic acid functional groups. The carboxylic acid functional crosslinker may be described by the formula:

$$HO_2C-[(CH_2)_n]-CO_2H$$

wherein n is an integer within the range of from 1 to 18. Examples of carboxylic acid functional crosslinkers include polycarboxy compounds such as dodecanedioic acid and its derivatives, azelaic acid, terephthalic acid, isophthalic acid, adipic acid, succinic acid, pimelic acid, sebacic acid, maleic acid, citric acid, itaconic acid, aconitic acid, octadecanedioic acid, and the like. Further examples of aliphatic dicarboxylic acids include 1,2-, 1,3-, and 1,4-cyclohexane dicarboxylic acid.

The carboxylic acid functional crosslinker may comprise a carboxylic acid group-containing polymer. Examples of carboxylic acid group-containing polymers include acrylic polymers, polyester polymers, and polyurethane polymers, where the acrylic, polyester, and/or polyurethane polymer contains 2 or more carboxylic acid groups.

The carboxylic acid functional crosslinker may comprise a combination of polyacids. The combination of polyacids may include any of the polyacids previously disclosed as suitable for use in the carboxylic acid functional crosslinker.

For example, the carboxylic acid functional crosslinker may comprise a combination of at least 2, or at least 3, or at least 4, or at least 5 polyacids.

The powder coating composition may comprise the carboxylic acid functional crosslinker in an amount of at least 3 weight %, or at least 5 weight %, or at least 7 weight %, or at least 7.5 weight %, based on the total solids weight of the powder coating composition. The powder coating composition may comprise the carboxylic acid functional crosslinker in an amount up to 20 weight %, or up to 18 weight %, or up to 15 weight %, or up to 12 weight %, based on the total solids weight of the powder coating composition. The powder coating composition may comprise the carboxylic acid functional crosslinker in an amount in a range of from 3 weight % to 20 weight %, or in the range of from 5 weight % to 18 weight %, or in the range of from 5 weight % to 15 weight %, or in the range of from 5 weight % to 12 weight %, or in the range of from 7 weight % to 15 weight %, or in the range of from 7.5 weight % to 12 weight %, based on the total solids weight of the powder coating composition.

The addition polymer and the carboxylic acid functional crosslinker may react to form a reaction product including at least one hydroxyl group. At least one acid group of the crosslinker may react with at least one epoxy group of the addition polymer.

The powder coating composition includes a blocked isocyanate functional crosslinker. The blocked isocyanate functional crosslinker (once unblocked) may be reactive with hydroxyl groups, such as the hydroxyl groups of the reaction product of the addition polymer and the carboxylic acid functional crosslinker. The blocked isocyanate functional crosslinker may be solid at ambient temperature (20° C.-25° C.).

The blocked isocyanate functional crosslinker may include a polyisocyanate. As used herein, the term "polyisocyanate" refers to a compound that contains 2 or more isocyanate functional groups. Polyisocyanates that may be used include aliphatic and aromatic diisocyanates as well as higher functional polyisocyanates. Non-limiting examples of suitable polyisocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof.

In some examples, two or more isocyanate functional crosslinkers may be linked together as dimers and/or trimers to form a polyisocyanate, such as a trimer of IPDI.

As used herein, the term "blocked isocyanate" refers to a compound with isocyanate functional groups that are internally blocked and/or have been reacted with an external blocking agent and which prevents the isocyanate functionality from reacting until the internal blocking and/or external blocking agent is removed, such as upon exposure to an external stimulus such as heat. Non-limiting examples of external blocking agents include phenols, pyridinols, thiophenols, methylethylketoxime, amides, caprolactam (e.g., ε-caprolactam), imidazoles, and pyrazoles. The blocked isocyanate may include an uretdione isocyanate, such as an uretdione internally blocked isocyanate adduct.

The blocked isocyanate functional crosslinker may comprise a ε-caprolactam-blocked isophorone diisocyanate. The ε-caprolactam-blocked isophorone diisocyanate may primarily include a blocked, difunctional, monomeric isophorone diisocyanate, such as a mixture of cis and trans isomers of 3-isocyanatomethyl-3,5,5-trimethylcyclohexylisocyanate, the blocked, difunctional dimer thereof, the blocked, trifunctional trimer thereof, or a mixture of the monomeric, dimeric, and/or trimeric forms. The blocked isocyanate functional crosslinker may comprise a mixture comprising ε-caprolactam-blocked, difunctional, monomeric isophorone diisocyanate and the ε-caprolactam-blocked, trifunctional trimer of isophorone diisocyanate.

The blocked isocyanate functional crosslinker may comprise an adduct of the 1,3-diazetidine-2,4-dione dimer of isophorone diisocyanate and a diol having the structure:

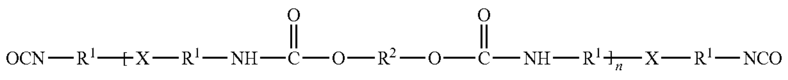

wherein n is greater than or equal to 1, and $R^1$ is a divalent 1-methylene-1,3,3-trimethyl-5-cyclohexyl radical, e.g., a radical having the structure:

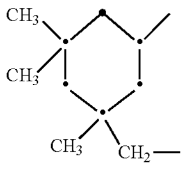

$R^2$ is a divalent aliphatic, cycloaliphatic, araliphatic or aromatic residue of a diol; and X is a 1,3-diazetidine-2,4-dionediyl radical, e.g., a radical having the structure:

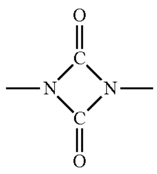

The ratio of NCO to OH groups in the formation of the adduct may be from 1:0.5 to 1:0.9. The mole ratio of diazetidinedione to diol may be from 2:1 to 10:9. The content of free isocyanate groups in the adduct may be not greater than 8 weight %, based on the total weight of the adduct. The adduct may have a weight and/or number average molecular weight of from 500 to 4000. The adduct may have a melting point and/or Tg of from 40° C. to 130° C. As used herein, melting point and/or Tg are measured using differential scanning calorimetry according to ASTM D3418-12, unless otherwise stated.

The adducts of the 1,3-diazetidine-2,4-dione dimer of isophorone diisocyanate and a diol may be prepared by reacting the diazetidine dimer of isophorone diisocyanate, in some examples free of isocyanurate trimers of isophorone diisocyanate, with diols in a ratio of reactants which gives as isocyanto:hydroxyl ratio of from 1:0.5 to 1:0.9, such as from 1:0.6 to 1:0.8. The adduct may have a weight or number average molecular weight of from 1450 to 2800 and a melting point of from 85° C. to 120° C. The diol reactant may include 1,4-butanediol.

The powder coating composition may comprise the isocyanate functional crosslinker in an amount of at least 0.1 weight %, or at least 0.5 weight %, or at least 1 weight %, or at least 3 weight %, or at least 5 weight %, based on the total solids weight of the powder coating composition. The powder coating composition may comprise the isocyanate functional crosslinker in an amount up to 20 weight %, or up to 15 weight %, or up to 12 weight %, or up to 10 weight %, based on the total solids weight of the powder coating composition. The powder coating composition may comprise the isocyanate functional crosslinker in an amount in the range of from 0.1 weight % to 20 weight %, or in the range of from 0.5 weight % to 20 weight %, or in the range of from 1 weight % to 20 weight %, or in the range of from 2 weight % to 20 weight %, or in the range of from 3 weight % to 20 weight %, or in the range of from 3 weight % to 15 weight %, or in the range of from 3 weight % to 12 weight %, or in the range of from 3 weight % to 10 weight %, or in the range of from 5 weight % to 10 weight %, based on the total solids weight of the powder coating composition.

The blocked isocyanate functional crosslinker may become unblocked when the powder coating composition is heated to a temperature of at least 100° C., or at least 120° C., or at least 150° C., or at least 180° C., rendering the isocyanate groups able to react with the hydroxyl groups of the reaction product of the addition polymer comprising epoxy functional groups and the carboxylic acid functional crosslinker. The additional crosslinking provided by the isocyanate functional crosslinker may provide the resultant coating with improved acid etch resistance.

The powder coating composition may comprise the addition polymer (a) in the range of from 50 weight % to 96 weight %, the carboxylic acid functional crosslinker (b) in the range of from 3 weight % to 20 weight %, and the blocked isocyanate functional crosslinker (c) in the range of from 0.1 weight % to 20 weight %, based on the total solids weight of the powder coating composition. The powder coating composition may comprise the addition polymer (a) in the range of from 70 weight % to 94 weight %, the carboxylic acid functional crosslinker (b) in the range of from 5 weight % to 18 weight %, and the blocked isocyanate functional crosslinker (c) in the range of from 1 weight % to 20 weight %, based on the total solids weight of the powder coating composition. The powder coating composition may comprise the addition polymer (a) in the range of from 75 weight % to 90 weight %, the carboxylic acid functional crosslinker (b) in the range of from 5 weight % to 15 weight %, and the blocked isocyanate functional crosslinker (c) in the range of from 3 weight % to 15 weight %, based on the total solids weight of the powder coating composition. The powder coating composition may comprise the addition polymer (a) in the range of from 80 weight % to 85 weight %, the carboxylic acid functional crosslinker (b) in the range of from 5 weight % to 12 weight %, and the blocked isocyanate functional crosslinker (c) in the range of from 3 weight % to 10 weight %, based on the total solids weight of the powder coating composition. For example, the powder coating composition may include the addition polymer (a) in an amount of 82 weight %, the carboxylic acid functional crosslinker (b) in an amount of 11 weight %, and the blocked isocyanate functional crosslinker (c) in an amount of 7 weight %, based on the total solids weight of the powder coating composition.

The powder coating composition may include additional materials. Non-limiting examples of materials that may be included in the powder coating composition include plasticizers, anti-oxidants, flow agents, surface control agents (e.g., anti-cratering additives), thixotropic agents, slip aids, catalysts, anti-gassing agents such as benzoin, reaction inhibitors (e.g., corrosion inhibitors), texturizers, UV absorbers, thermal antioxidant stabilizers, light stabilizers (e.g., hindered amine light stabilizers (HALS)), and other customary auxiliaries.

The powder coating composition may include a pigment. Alternatively, the powder coating composition may be substantially free, essentially free, or completely free of a pigment. The phrase "substantially free of a pigment" means that the coating composition contains less than 1000 parts per million by weight (ppm) of a pigment based on the total solids weight of the powder coating composition, "essentially free of a pigment" means that the coating composition contains less than 100 ppm of a pigment based on the total solids weight of the powder coating composition, and "completely free of a pigment" means that the coating composition contains less than 20 parts per billion by weight (ppb) of a pigment based on the total solids weight of the powder coating composition.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures or combinations thereof.

The present invention also relates to a substrate at least partially coated with a coating formed from the powder coating composition described herein. For example, the powder coating composition may be applied to vehicle substrates, including automotive substrates, industrial substrates, aerospace substrates, marine substrates, packaging substrates, electronics, architectural substrates, and the like.

In the present disclosure, the term "vehicle" is used in its broadest sense and includes all types of aircraft, spacecraft, watercraft, and ground vehicles. For example, the vehicle can include, but is not limited to an aerospace substrate, such as an aircraft such as, for example, airplanes (e.g., private airplanes, and small, medium, or large commercial passenger, freight, and military airplanes), helicopters (e.g., private, commercial, and military helicopters), aerospace vehicles (e.g., rockets and other spacecraft), and the like. The vehicle can also include a ground vehicle such as, for example, animal trailers (e.g., horse trailers), cars, trucks, buses, vans, heavy duty equipment, golf carts, motorcycles, bicycles, trains, railroad cars, and the like. The vehicle can also include watercraft such as, for example, ships, boats, hovercraft, and the like.

The coating composition may be applied over an industrial substrate which may include tools, heavy duty equipment, furniture such as office furniture (e.g., office chairs, desks, filing cabinets, and the like), appliances such as refrigerators, ovens and ranges, dishwashers, microwaves, washing machines, dryers, small appliances (e.g., coffee makers, slow cookers, pressure cookers, blenders, etc.), metallic hardware, extruded metal such as extruded aluminum used in window framing, other indoor and outdoor metallic building materials, and the like.

Suitable architectural substrates over which the coating compositions may be applied include, but are not limited to, metallic or non-metallic substrates including: concrete, stucco, masonry elements, cement board, MDF (medium density fiberboard) and particle board, gypsum board, wood, stone, metal, plastics (e.g., vinyl siding and recycled plastics), wall paper, textiles, plaster, fiberglass, ceramic, and the like, which may be pre-primed by waterborne or solvent borne primers. The architectural substrate may be an interior wall (or other interior surface) of a building or residence. The architectural substrate may be an outdoor substrate exposed to outdoor conditions. The architectural substrate may be smooth or textured.

Specific non-limiting substrates include cars, trucks, ships, vessels, on-shore and off-shore installations, storage tanks, windmills, power industry substrates such as nuclear plants, power wires, batteries and battery components, bus bars, metal wires, copper or aluminum conductors, wood flooring and furniture, apparel, housings and circuit boards, glass and transparencies, sports equipment, including golf balls, stadiums, buildings, bridges, and the like.

The powder coating composition may be applied over at least a portion of a substrate comprising a metal wheel, such as a metal wheel included as a component of a vehicle, such as a-metal wheel of an automobile. The metal wheel may comprise aluminum, steel, magnesium, or an alloy thereof. The powder coating composition may be applied over at least a portion of the metal wheel. The powder coating composition may be applied as a monocoat over the metal wheel or as a coating layer in a multi-layer coating system applied to the metal wheel.

The substrates may comprise, for example, metallic or non-metallic substrates. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. The metallic substrate may comprise aluminum, steel, magnesium, or an alloy thereof. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather both synthetic and natural, and the like.

The coating composition may be applied to a substrate to form a monocoat. As used herein, a "monocoat" refers to a single layer coating system that is free of additional coating layers. Thus, the coating composition may be applied directly to a substrate and cured to form a single layer coating, i.e., a monocoat. The single coating layer may be applied over a pretreatment layer, as defined hereinafter, which pretreatment layer is not a coating layer. When the curable coating composition is applied to a substrate to form a monocoat, the coating composition may include additional components to provide other desirable properties. For example, the curable coating composition may also include an inorganic component that acts as a corrosion inhibitor. As used herein, a "corrosion inhibitor" refers to a component such as a material, substance, compound, or complex that reduces the rate or severity of corrosion of a surface on a metal or metal alloy substrate. The inorganic component that acts as a corrosion inhibitor may include, but is not limited to, an alkali metal component, an alkaline earth metal component, a transition metal component, or combinations thereof.

The term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb), and sodium (Na). The term "alkaline earth metal" refers to an element of Group 2 (IUPAC) of the periodic table of the chemical elements, and includes, e.g., barium (Ba), beryllium (Be), calcium (Ca), magnesium (Mg), and strontium (Sr). The term "transition metal" refers to an element of Groups 3 through 12 (IUPAC) of the periodic table of the chemical elements, and includes, e.g., titanium (Ti), chromium (Cr), and zinc (Zn), among various others.

Specific non-limiting examples of inorganic components that act as a corrosion inhibitor include magnesium oxide, magnesium hydroxide, magnesium carbonate, magnesium phosphate, magnesium silicate, zinc oxide, zinc hydroxide, zinc carbonate, zinc phosphate, zinc silicate, zinc dust, and/or combinations thereof.

The compositions of the present invention may be used alone, or in combination with one or more other compositions, such as a coating system having two or more coating layers (a multi-layer coating system). For example, the compositions of the present invention may comprise a pigment or not and may be used as a primer layer, basecoat, and/or topcoat.

The coating composition may be used to form a primer layer. As described herein, a "primer layer" refers to an undercoating that may be deposited onto a substrate in order to prepare the surface for application of a protective or decorative coating system.

The coating composition may be used to form a topcoat layer. As described herein, a "topcoat" refers to an uppermost coating that is deposited over another coating layer such as a basecoat to provide a protective and/or decorative layer. The topcoat layer may be a clearcoat layer. A clearcoat layer will be understood as a coating layer that is substantially transparent or translucent. A clearcoat layer may therefore have some degree of color, provided it does not make the clearcoat opaque or otherwise affect, to any significant degree, the ability to see the underlying substrate. The clearcoat layer may be used, for example, in conjunction with a pigmented basecoat. The coating composition may be used as a topcoat layer over the substrate to provide durability to the substrate.

The coating composition may be used to form a basecoat layer. The multilayer coating system may have a first basecoat and a second basecoat coated over the first basecoat. As described herein, a "basecoat" refers to a coating that is deposited onto a primer and/or directly onto a substrate, optionally including components (such as pigments) that impact the color and/or provide other visual impact. For substrates coated with multiple basecoat layers, one or more of those basecoat layers may be formed from the coating composition as described herein.

The composition may comprise a pigment, such as a pigmented basecoat used in conjunction with a clearcoat, or as a pigmented monocoat. Such coating layers may be used in various industries to impart a decorative and/or protective finish. For example, such a coating or coating system may be applied to a vehicle, such as the wheel of a vehicle. It will be appreciated that the portion of the vehicle that is coated according to the present invention may vary depending on why the coating is being used. When used as a colored basecoat or monocoat, the present coatings may be applied to those portions of the vehicle that are visible such as the roof, hood, doors, trunk lid, and the like of a car, but may also be applied to other areas such as inside the trunk, inside the door and the like especially when the compositions are formulated as sealants or adhesives; for example, the compositions may be formulated so as to have a viscosity such that they provide sound and/or vibration damping to a vehicle. The present compositions may also be applied to those portions of the vehicle that are in contact with the driver and/or passengers, such as the steering wheel, dashboard, gear shift, controls, door handle and the like. Clearcoats may be applied to the exterior of a vehicle.

The substrate may comprise a pretreatment layer positioned over the substrate and the coating formed from the powder coating composition as described herein positioned over at least a portion of the pretreatment layer. As used herein, a "pretreatment layer" refers to a layer formed from a composition that reacts with and chemically alters the substrate surface achieving at least one of the following: 1) formation of a protective layer; 2) improved substrate topography or reactivity to enhance coating adhesion; or 3) formation of a protective layer with improved coating adhesion in comparison to the substrate without pretreatment. The pretreatment layer may form a discontinuous layer over the surface. Non-limiting examples of pretreatment layer compositions include compositions that comprise iron phosphate, manganese phosphate, zinc phosphate, a rare earth metal, permanganate or manganese, molybdate or molybdenum, zirconium, titanium, hafnium, lanthanides, a silane such as an alkoxysilane, hydrolyzed silanes and silane oligomers and polymers, metal chelates, trivalent chrome (TCP), silicate, silica, phosphonic acids, chromate conversion coating, hydrotalcite, layered double hydroxides, metal oxides, other metals such as Group IV metals, or any combination thereof. Non-limiting examples of organic pretreatments may include chemically modified resins such as phosphatized epoxies, silanized epoxies and amino functional resins. The pretreatment may also include anodizing using, for example, sulfuric acid, nitric acid, hydrofluoric acid, tartaric acid, and/or other anodizing methods. The pretreatment layer composition may be in the form of a sol-gel, a liquid, or a solid. In some instances, a pretreatment may contain or be sealed using an oligomeric or polymeric solution or suspension. In yet other instances, a pretreatment composition may contain small organic molecules with reactive functionality or those which function as corrosion inhibitors.

The present invention also relates to a method of applying the powder coating composition as described herein to a substrate. The powder coating composition, once prepared, may be applied to at least a portion of a substrate and cured to form a coating. The powder coating composition may be applied to a substrate using any suitable technique. Suitable methods for applying the powder coating composition to any of the previously described substrates include electrostatic spraying, dipping, and the like. The powder coating composition may be applied in a single pass or in several passes to provide a film having a thickness after cure of from 1 to 10 mils, such as from 1 to 5 mils. After application, the present compositions may be cured by heating to a temperature of from 120° C. to 220° C., such as from 140° C. to 190° C., such as from 160° C. to 180° C., for a period ranging from 3 minutes to 30 minutes, such as 15 to 25 minutes. Heating may be effected by any means known in the art, such as by placing the coated substrate in an oven. IR radiation may be used to cure the coated substrates.

The powder coating composition may be used to reduce filiform corrosion. As used herein, "filiform corrosion" refers to a type of corrosion that occurs in thin films and coatings characterized by thread-like filament defects on and/or under the surface of the coating. The powder coating composition may form a coating over at least a portion of a substrate and may reduce the amount of filiform corrosion of the coated substrate compared to an identical substrate without the coating formed from the powder coating composition under the same conditions (i.e., same environmental conditions). For example, it was found that the coated substrates of the present invention may provide improved filiform corrosion resistance (tested in accordance with SAE J2635 "Filiform Corrosion Test Procedure for Painted Aluminum Wheels and Painted Aluminum Wheel Trim"), as compared to the same coated substrate that does not include a coating formed from the powder coating composition of the present invention. Moreover, the coating compositions of the present invention make it possible to avoid such corrosion without the need for spraying a liquid composition before the applying the powder coat.

EXAMPLES

The following examples are presented to demonstrate the general principles of the invention. The invention should not be considered as limited to the specific examples presented.

Example 1

Synthesis of a Powder Acrylic Polymer

A powder acrylic polymer was prepared from the components in Table 1.

| Component | Parts by weight (grams) |
|---|---|
| Charge 1 | |
| Xylene | 264.2 |
| Charge 2 | |
| Glycidyl Methacrylate (GMA) | 119.3 |
| Methyl Methacrylate (MMA) | 432.6 |
| Butyl Methacrylate (BMA) | 402.8 |
| Styrene | 238.7 |
| Charge 3 | |
| Xylene | 11.9 |
| Charge 4 | |
| LUPEROX 575[1] | 74.6 |
| Xylene | 165.8 |
| Charge 5 | |
| Xylene | 11.9 |
| Charge 6 | |
| LUPEROX 575[1] | 14.9 |
| Xylene | 33.2 |

-continued

| Component | Parts by weight (grams) |
|---|---|
| Charge 7 | |
| Xylene | 11.9 |

[1]tert-amyl peroxy-2-ethylhexanoate, commercially available from Arkema (Colombes, France)

Charge 1 was added into a 4-neck 3L round bottom flask that is equipped with a thermocouple, reflux condenser, nitrogen inlet port, air motor agitator, and two additional ports, and was heated to reflux (approx. 138° C. (280° F.)) under a nitrogen blanket. Once a temperature of approximately 138° C. (280° F.) was reached, Charge 2 and Charge 4 were added, simultaneously, with the addition occurring over a span of 180 minutes. Upon completion of the addition of Charge 2 and Charge 4, the addition funnels were washed with Charge 3 and Charge 5, respectively, and the batch was held for 30 minutes at a constant temperature of 138° C. (280° F.). Charge 6 was then introduced over 30 minutes, which was followed by a rinse with Charge 7, and the batch was then held for 30 minutes at a temperature of 138° C. (280° F.). Upon completion of the polymerization, the solvent was removed from the batch by vacuum distillation during which the batch was gradually heated to 170° C. (338° F.) under vacuum and held at a constant temperature for an additional 60 minutes after the distillate stopped collecting. The final polymer had a number average molecular weight of 2,569 g/mol, a weight average molecular weight of 7,142 g/mol, a total solids content of 96.8%, and an epoxy equivalent weight of 1,470. As used herein, epoxy equivalent weight is the mass, in grams, of sample containing one mole of epoxide functionality, as determined by potentiometric titration with perchloric acid and quaternary ammonium bromide.

The powder acrylic polymer formed in Example 1 from the components in Table 1 corresponds to Resin #1 in Table 2 below. Resins #2-#5 were also formed using the method described for Example 1 and the components in Table 1, except for the amounts of each of the components in Charge 2 were adjusted to reflect the weight percentages included for each Resin in Table 2.

TABLE 2

| | Resin compositions | | | | |
|---|---|---|---|---|---|
| Component | Acrylic Resin #1 | Acrylic Resin #2 | Acrylic Resin #3 | Acrylic Resin #4 | Acrylic Resin #5 |
| GMA | 10.00% | 12.50% | 15.00% | 20.00% | 22.50% |
| BMA | 33.75% | 32.00% | 30.00% | 26.50% | 24.75% |
| MMA | 36.25% | 35.50% | 35.00% | 33.50% | 32.75% |
| Styrene | 20.00% | 20.00% | 20.00% | 20.00% | 20.00% |
| Fox Tg (°C) | 64.1 | 64.1 | 64.2 | 64.2 | 64.1 |
| theory EEW (on solids) | 1528.1 | 1222.5 | 1018.7 | 764.1 | 679.2 |

Examples 2-13

Preparation of Curable Coating Compositions

Twelve (12) curable coating compositions were prepared from the components listed in Table 3.

TABLE 3

| Component | Ex. 2 (gram) | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|
| POWDERMATE 542DG[2] | 0.6 | 0.6 | 0.6 | 0.6 | 0.6 | 0.6 | 0.6 | 0.6 | 0.6 | 0.6 | 0.6 | 0.6 |
| POWDERMATE 575FL[3] | 1.6 | 1.6 | 1.6 | 1.6 | 1.6 | 1.6 | 1.6 | 1.6 | 1.6 | 1.6 | 1.6 | 1.6 |
| ALMATEX PD7610[4] | 84.5 | 78.6 | — | — | — | — | — | — | — | — | — | — |
| Acrylic Resin #5 | — | — | 86.9 | 80.8 | — | — | — | — | — | — | — | — |
| Acrylic Resin #4 | — | — | — | — | 88.5 | 82.3 | — | — | — | — | — | — |
| Acrylic Resin #3 | — | — | — | — | — | — | 90.7 | 84.4 | — | — | — | — |
| Acrylic Resin #2 | — | — | — | — | — | — | — | — | 92.3 | 85.9 | — | — |
| Acrylic Resin #1 | — | — | — | — | — | — | — | — | — | — | 93.8 | 87.2 |
| VESTAGON BF 1540[5] | — | 7.0 | — | 7.0 | — | 7.0 | — | 7.0 | — | 7.0 | — | 7.0 |
| Dodecanedioic Acid[6] | 15.5 | 14.4 | 13.1 | 12.2 | 11.5 | 10.7 | 9.3 | 8.6 | 7.7 | 7.1 | 6.2 | 5.8 |

[2]an amide-modified phenolated urea surfactant degassing agent, commercially available from the Troy Corporation (Florham Park, NJ)

[3]an amid-ester modified polyether oligomer flow and levelling agent, commercially available from the Troy Corporation (Florham Park, NJ)

[4]a glycidyl (meth)acrylate based, epoxy functional acrylic resin having an epoxy equivalent weight of approximately 535, commercially available from the Anderson Development Company (Adrian, MI)

[5]a uretdione-blocked isocyanate crosslinker, commercially available from Evonik Industries (Essen, Germany)

[6]a linear difunctional carboxylic acid crosslinker, commercially available from Sigma Aldrich (St. Louis, MO)

Each of the components listed in Table 3, for each of Examples 2-13, were weighed in a container and mixed in a PRISM high speed mixer for 30 seconds at 22500 RPM to form a dry homogeneous mixture. The mixture was then melt mixed in a Werner Pfleiderer 19 mm twin screw extruder with an aggressive screw configuration and a speed of 500 RPM. The first zone was set to 50° C., and the second, third, and fourth zones were set to 120° C. The feed rate was such that a torque of 30%-45% was observed on the equipment. The mixtures were dropped onto a set of chill rolls to cool and re-solidify the mixtures into solid chips. The chips were milled in a Mikro ACM-11 Air Classifying Mill to obtain an average particle size of 10 microns to 100 microns. The resulting coating compositions for each of Examples 2-13 were solid particulate powder coating compositions that were free flowing.

Example 14

Preparation of Aluminum Test Panels and Application of Powder Coatings

An A-412 Aluminum Q-Panel, from ACT (Hillsdale, MI), for each of Examples 2-13 was cleaned using an alkaline spray cleaner ULTRAX 14AWS, commercially available from PPG Industries, Inc. (Pittsburgh, PA). Each panel was then deoxidized in AMC66AW acid etch solution, commercially available from PPG Industries, Inc. (Pittsburgh, PA). Each panel was then pretreated using XBOND4000 zirconium pretreatment, commercially available from PPG Industries, Inc. (Pittsburgh, PA). Examples 2-13 were electrostatically applied to the panels at a film build of 2 mils to 5 mils. The coated panels were baked at a temperature of 171° C. or 191° C. (specified in Table 4) for 30 minutes.

Example 15

Evaluation of Filiform Corrosion Resistance

Each of the coatings prepared from the compositions of Examples 2-13 were evaluated for filiform corrosion resistance and final film thickness. The film build was measured with a dry film gauge from Elcometer. The filiform corrosion resistance was determined according to SAE J2635. The panels were scribed and placed in a Copper-Accelerated Acetic Acid Salt Spray cabinet for 1 day to initiate filiform filament growth. The panels were then placed in a humidity cabinet for 28 days to grow the filiform filaments. Each panel was then measured for filiform corrosion using the method of SAE J2635; the filiform scribe creep magnitudes of each being provided in Table 4, below.

TABLE 4

| Example | Bake Temp. (°C) | Maximum Filiform Average from 4 scribes (mm) | % GMA | GMA content's Maximum Filiform Average (mm) |
|---|---|---|---|---|
| 2 | 177 | 3.6 | ~26 | 4.5 |
| 2 | 191 | 4.5 | | |
| 3 | 177 | 4.8 | | |
| 3 | 191 | 5 | | |
| 4 | 177 | 2.6 | 22.5 | 3.3 |
| 4 | 191 | 4 | | |
| 5 | 177 | 3.6 | | |
| 5 | 191 | 2.8 | | |
| 6 | 177 | 2.3 | 20 | 1.9 |
| 6 | 191 | 2.4 | | |
| 7 | 177 | 1.3 | | |

TABLE 4-continued

| Example | Bake Temp. (°C) | Maximum Filiform Average from 4 scribes (mm) | % GMA | GMA content's Maximum Filiform Average (mm) |
|---|---|---|---|---|
| 7 | 191 | 1.6 | | |
| 8 | 177 | 1.9 | 15 | 1.8 |
| 8 | 191 | 2.5 | | |
| 9 | 177 | 1.8 | | |
| 9 | 191 | 0.8 | | |
| 10 | 177 | 2.5 | 12.5 | 1.9 |
| 10 | 191 | 1.3 | | |
| 11 | 177 | 2.5 | | |
| 11 | 191 | 1.3 | | |
| 12 | 177 | 2.1 | 10 | 2.4 |
| 12 | 191 | 2.3 | | |
| 13 | 177 | 2.3 | | |
| 13 | 191 | 2.8 | | |

As shown in Table 4, it is observed that coatings comprising lower GMA content exhibits the lowest filiform corrosion growth. For example, the coatings produced from the compositions of Examples 6-13, all of which including a GMA content of less than 22 wt %, exhibit acceptable filiform corrosion resistance. However, when the GMA content is increased to an amount of greater than 22 weight %, as in the coatings produced from the compositions of Examples 2-5, said coatings exhibit filiform corrosion resistance. As such, acceptable filiform corrosion resistance is achieved by incorporating less than 22 wt % of an epoxy functional ethylenically unsaturated monomer in the mixture of reactants used to form the addition polymer. Moreover, the GMA content providing the best filiform resistance was in the range of greater than 10 wt % and less than 22 wt %.

Example 16

Evaluation of Physical Properties

Each coating formed from the compositions of Examples 2-13 were also tested for physical properties and appearance. Adhesion testing was performed according to ISO 2409. Water immersion testing was performed according to NES M0007, 29 (60° C. water immersion for 3 days, followed by crosshatch adhesion). 100 MEK double rubs testing was conducted according to ASTM D5402-15 under appendix X1.2.2. Gasoline resistance was performed according to 4271Z-SNA-A000, where gasoline was applied to the panels for 6.18-7 hours at room temperature and then the panels are checked for appearance or adhesion changes. The appearance measurements were generated using a glossmeter and BYK-MAC color reader. The data produced for each Example is provided in Table 5, below.

TABLE 5

| Example | 20° gloss | 100 MEK double rubs | post-gas soak appearance | Adhesion | Recoat Adhesion | Post-Humidity Adhesion |
|---|---|---|---|---|---|---|
| 2 | 102 | slight mar | clear | 10 | 10 | 10 |
| 3 | 101 | slight mar | clear | 10 | 10 | 10 |
| 4 | 75 | slight mar | clear | 10 | 10 | 10 |
| 5 | 102 | slight mar | clear | 10 | 10 | 10 |
| 6 | 88 | slight/moderate mar | clear | 10 | 10 | 10 |
| 7 | 101 | slight/moderate mar | clear | 10 | 10 | 10 |
| 8 | 89 | moderate mar | clear | 7 | 9 | 8 |
| 9 | 104 | moderate mar | clear | 7 | 10 | 7 |
| 10 | 98 | heavy mar | rough | 0 | 10 | 0 |
| 11 | 103 | heavy mar | rough | 0 | 10 | 2 |

TABLE 5-continued

| Example | 20° gloss | 100 MEK double rubs | post-gas soak appearance | Adhesion | Recoat Adhesion | Post-Humidity Adhesion |
|---|---|---|---|---|---|---|
| 12 | 40 | heavy mar | very rough | 0 | 0 | 0 |
| 13 | 94 | heavy mar | rough | 0 | 0 | 0 |

As shown in Table 5, it is observed that exceedingly low GMA content resins generate poorer properties in the coatings they are used in. For example, the coatings produced from the compositions of Examples 2-9, which include a GMA content of greater than 15 weight %, exhibit only slight to moderate marring from MEK double rubs testing, maintain a clear and glossy appearance after gasoline resistance testing, and exhibit acceptable adhesion to the panels. In contrast, the coatings produced from the compositions of Examples 10-13 all exhibit heavy marring after MEK double rubs testing, a rough appearance after gasoline resistance testing, and little to no adhesion to the panels. As such, the most robust physical properties are achieved by incorporating at least 15 weight % of an epoxy functional ethylenically unsaturated monomer in the mixture of reactants used to form the addition polymer.

By carefully selecting the components of the powder coating compositions, and specifically, the amount of an epoxy functional ethylenically unsaturated monomer in the mixture of reactants used to form the addition polymer as discussed herein, it was unexpected and surprising to find that the coatings formed from a powder coating composition comprising an addition polymer formed from a mixture of reactants comprising greater than 10 weight % and less than 22 weight % of an epoxy functional ethylenically unsaturated monomer having low filiform corrosion, and a mixture of reactants comprising 15 weight % to 20 weight % of an epoxy functional ethylenically unsaturated monomer having low filiform corrosion and also excellent adhesion, gasoline resistance including a clear and glossy appearance, and only slight to moderate marring.

Whereas particular embodiments of this invention have been described above for purposes of illustration, it will be evident to those skilled in the art that numerous variations of the details of the present invention may be made without departing from the invention as defined in the appended claims.

The invention claimed is:

1. A powder coating composition, comprising:

(a) an addition polymer comprising epoxy functional groups, present in the powder coating composition in an amount of at least 60 weight %, based on the total solids weight of the powder coating composition, wherein the addition polymer is obtained from components comprising:

(i) at least one epoxy functional ethylenically unsaturated monomer, wherein the components comprise an amount of (i) the at least one epoxy functional ethylenically unsaturated monomer within a range of greater than 10 weight % and less than 22 weight %, based on the components that form the addition polymer; and wherein the addition polymer has a weight average molecular weight of from 2000 g/mol to 16,000 g/mol, as determined by gel permeation chromatography using a polystyrene standard according to ASTM D6579-11;

(b) a carboxylic acid functional crosslinker; and (c) a blocked isocyanate functional crosslinker.

2. The powder coating composition of claim 1, wherein (i) the at least one epoxy functional ethylenically unsaturated monomer comprises an epoxy functional (meth)acrylate monomer.

3. The powder coating composition of claim 2, wherein the epoxy functional (meth)acrylate monomer comprises a mono-epoxy functional (meth)acrylate monomer.

4. The powder coating composition of claim 1, wherein the components that form the addition polymer further comprise (ii) at least one non-functional ethylenically unsaturated monomer.

5. The powder coating composition of claim 4, wherein (ii) the at least one non-functional ethylenically unsaturated monomer comprises at least two different non-functional ethylenically unsaturated monomers.

6. The powder coating composition of claim 5, wherein (ii) the non-functional ethylenically unsaturated monomers comprise an aliphatic non-functional ethylenically unsaturated monomer and an aromatic non-functional ethylenically unsaturated monomer.

7. The powder coating composition of claim 4, wherein the components comprise at least 50 weight % of (ii) the non-functional ethylenically unsaturated monomers, based on the components that form the addition polymer.

8. The powder coating composition of claim 1, wherein a reaction product of (a) and (b) comprises hydroxyl functional groups, and (c) the blocked isocyanate functional crosslinker is reactive with the hydroxyl functional groups.

9. The powder coating composition of claim 1, wherein the components comprise (i) the at least one epoxy functional ethylenically unsaturated monomer in an amount within a range of from 15 weight % to 20 weight %, based on the components that form the addition polymer.

10. The powder coating composition of claim 1, wherein the powder coating composition is substantially free of a pigment.

11. The powder coating composition of claim 1, wherein the addition polymer comprises has a glass transition temperature of at least 30° C. as measured by differential scanning calorimetry according to ASTM D3418-12.

12. The powder coating composition of claim 1, wherein the powder coating composition comprises at least 70 weight % of (a) the addition polymer, based on the total solids weight of the powder coating composition.

13. A substrate at least partially coated with a coating formed from the powder coating composition of claim 1.

14. The substrate of claim 13, wherein the substrate comprises a metal.

15. The substrate of claim 14, wherein the metal comprises aluminum, steel, magnesium, or an alloy thereof.

16. The substrate of claim 13, wherein the substrate comprises a metal wheel for a vehicle.

17. The substrate of claim 13, wherein the substrate comprises a pretreatment layer underlying at least a portion of the coating.

18. The substrate of claim 13, wherein the coating forms a monocoat over at least a portion of the substrate.

19. A method of preparing a metal wheel, comprising: applying the powder coating composition of claim 1 over at least a portion of the metal wheel.

20. The method of claim 19, wherein the powder coating composition is applied so as to form a monocoat over the at least a portion of the metal wheel.

* * * * *